United States Patent Office.

J. J. FIELDS AND A. H. KING, OF NEW YORK, N. Y., ASSIGNEES, BY MESNE ASSIGNMENTS, OF HENRY W. JOSLIN.

*Letters Patent No.* 59,402, *dated November* 6, 1866; *reissue No.* 3,112, *dated September* 8, 1868.

IMPROVEMENT IN THE MANUFACTURE OF RUBBER-COATED LEATHER.

The Schedule referred to in these Letters Patent and making part of the same.

TO ALL WHOM IT MAY CONCERN:

Be it known that HENRY W. JOSLIN, of Brooklyn, in the county of Kings, and State of New York, did invent a new and improved Rubber-Coated Leather; and we, J. J. FIELDS and A. H. KING, of the city, county, and State of New York, assignees of the said HENRY W. JOSLIN, do hereby declare that the following is a full, clear, and exact description thereof, which will enable others skilled in the art to make and use the same.

This invention relates to a new water-tight elastic material, and consists in coating leather with plastic india rubber or gutta percha, either on one or both sides, the rubber congealing after application.

The raw rubber, which is prepared for vulcanization in the usual or suitable manner, is applied in a plastic state upon the leather, and afterwards subjected to the vulcanizing process, whereby the rubber or gutta percha is caused to adhere to the leather with much greater tenacity and permanence than when united thereto by means of cement, as has heretofore been practised, and whereby, as a consequence, the fabric is much better adapted to those uses for which strong water-proof material is required.

The following is a description of one process of treating the rubber during application, but we do not confine ourselves to the use of that particular process.

The India rubber or other vulcanizable gum is first prepared with sulphur, as required in the vulcanization thereof for other purposes, and, being then in a plastic condition, is evenly spread upon the surface of the leather, by passing the leather, together with the aforesaid plastic rubber, through the "calenders," or by otherwise evenly applying it either between plates, rollers, or other suitable devices.

The sheet of leather thus coated with the plastic rubber is placed with the coated surface against or upon a steam-table or other plate, which is heated to a temperature of from 250° to 270° of Fahrenheit, or, in other words, to a temperature sufficient to produce the vulcanization of the rubber. A metal plate is laid upon or against the non-heated surface of the leather to press the leather upon the heated table, to thereby keep it in its place.

The rubber-coated leather is in this manner retained upon or against the heated table for about an hour and a half, during which time the plate placed upon the leather, as just mentioned, is temporarily removed about three times, at nearly equal intervals, in order to allow the leather to cool, and to thus prevent it from becoming too highly heated, and to avoid the consequent injury.

While, in this manner, the cooking process is performed by the heat communicated from the steam-table, or its equivalent, the vulcanization of the rubber is completed, and, inasmuch as the rubber or other gum is retained in the closest and most intimate contact with the surface of the leather during the entire "cooking" process just described, the said rubber or gum is caused to adhere to the surface of the leather with a tenacity greatly exceeding that with which sheets of rubber can be made to adhere to leather by means of cement in the manner heretofore adopted.

Instead of a steam-table, a plate heated to the required degree by any other suitable means might be employed in conducting the cooking process aforesaid.

The above is a description of one process of treating the rubber in order to make it congeal on the leather, but other processes of suitable kind may be used with equal advantage, and we do not confine ourselves to any particular mode or manner of treating the rubber, but Claim as new, and desire to secure by Letters Patent—

1. Leather coated with India rubber or gutta percha, in the manner substantially as herein set forth.

2. Applying the rubber to the surface of the leather in a raw state, and letting it congeal on the same, as specified.

J. J. FIELDS,
A. H. KING.

Witnesses:
FRANK BLOCKLEY,
ALEX. F. ROBERTS.